US010670337B2

(12) United States Patent
Jayne et al.

(10) Patent No.: US 10,670,337 B2
(45) Date of Patent: Jun. 2, 2020

(54) APPARATUS FOR DRYING ROOMS

(71) Applicant: DBK David + Baader GmbH, Rülzheim (DE)

(72) Inventors: Jonathan Jayne, Llantrisant (GB); Pawel Tomasz Turek, Rhondda Cynon Taff (GB); Ashley Charles Norman, Swansea (GB); Richard Ralph Halstead, Cheltenham (GB); Ian David Hopkin, Vale of Glamorgan (GB)

(73) Assignee: DBK DAVID + BAADER GMBH, Rülzheim (DE)

( * ) Notice: Subject to any disclaimer, the term of this patent is extended or adjusted under 35 U.S.C. 154(b) by 442 days.

(21) Appl. No.: 14/987,417

(22) Filed: Jan. 4, 2016

(65) Prior Publication Data

US 2017/0191756 A1    Jul. 6, 2017

(51) Int. Cl.
*F26B 9/00* (2006.01)
*E04B 1/70* (2006.01)
*F16K 11/052* (2006.01)
*F26B 21/00* (2006.01)

(52) U.S. Cl.
CPC ............ *F26B 9/003* (2013.01); *E04B 1/7015* (2013.01); *F16K 11/052* (2013.01); *F16K 11/0525* (2013.01); *F26B 21/001* (2013.01)

(58) Field of Classification Search
CPC .... F26B 9/003; F26B 3/02; F26B 9/02; E04B 1/7015; F16K 11/052; F16K 11/0525
USPC ............................................... 34/417; 62/404
See application file for complete search history.

(56) References Cited

U.S. PATENT DOCUMENTS

| 5,911,243 | A | * | 6/1999 | Cohen ................. F16K 11/0525 |
| | | | | 137/625.43 |
| 6,038,879 | A | * | 3/2000 | Turcotte .................. F24F 1/022 |
| | | | | 62/325 |
| 6,327,812 | B1 | | 12/2001 | Hedman et al. |
| 6,892,491 | B2 | | 5/2005 | Hedman |
| 7,690,148 | B2 | | 4/2010 | Hedman |
| 7,837,932 | B2 | | 11/2010 | Hedman |
| 8,221,678 | B2 | | 7/2012 | Hedman |
| 8,256,135 | B2 | | 9/2012 | Hedman |
| 8,272,143 | B1 | | 9/2012 | Hedman |
| 9,015,960 | B2 | | 4/2015 | Hopkin et al. |
| 2002/0066223 | A1 | | 6/2002 | Hedman et al. |
| 2008/0039005 | A1 | * | 2/2008 | Coven ....................... F24F 7/00 |
| | | | | 454/234 |
| 2010/0011612 | A1 | * | 1/2010 | Jayne .................... E04B 1/7069 |
| | | | | 34/417 |

(Continued)

*Primary Examiner* — Edelmira Bosques
*Assistant Examiner* — Bao D Nguyen
(74) *Attorney, Agent, or Firm* — King & Schickli, PLLC

(57) ABSTRACT

A hand-portable drying apparatus and method for use in a damp or waterlogged room, the apparatus including a housing having a carrying handle, the housing containing first and second airflow ducts arranged generally parallel to each other and having respective air inlet and air outlet ends, the apparatus further including means to force air through the ducts and to selectively heat it in at least one of the ducts, and valve means within the housing to selectively direct air from the first duct to the second duct whereby to move air from within the room received by the first duct back to the room via the second duct or to expel air from the room via the first duct to outside the room and draw in fresh air from outside the room via the second duct.

8 Claims, 8 Drawing Sheets

(56) References Cited

U.S. PATENT DOCUMENTS

2011/0064605 A1 3/2011 Hedman
2011/0064607 A1 3/2011 Hedman
2011/0219665 A1 9/2011 Hedman

* cited by examiner

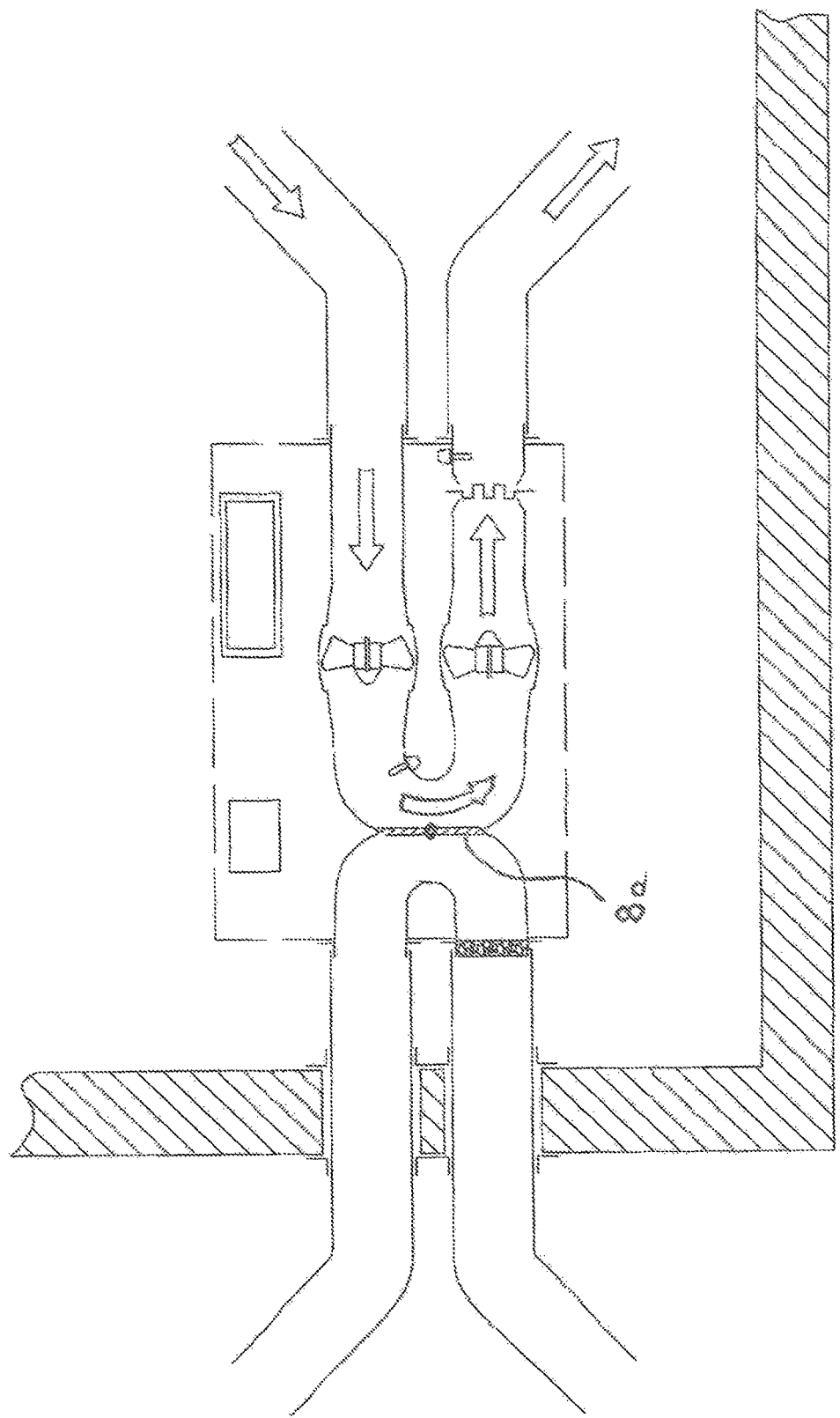

APPARATUS FOR DRYING ROOMS

This invention relates to the general subject of water damaged rooms and buildings as described in U.S. Pat. No. 9,015,960 (the "960 patent"), the disclosure of which is incorporated herein by reference.

BACKGROUND OF THE INVENTION

The '960 patent describes a novel method of drying a damp or waterlogged room through the use of heated ducting which permits heated air to be recirculated within the room until it reaches a required humidity level or until a given time period has elapsed, whereafter the heated air is exhausted from the room via the ducting. The apparatus for accomplishing this is shown in FIGS. 4 to 7 of the '960 patent and essentially consists of a portable steel trolley supporting a housing and various air inlet and outlet ducts, five in total, for moving heated air around the room being dried in air recirculation mode and, in exhaust mode, removing hot and humid air from the room, to be replaced by ambient air from outside. This arrangement has proven to be very satisfactory in many respects but has some disadvantages, including that the apparatus is quite bulky and therefore cannot be used in confined spaces, such as in crawl spaces below floors or roofs. In addition, being mounted on a trolley the apparatus is quite heavy, weighing over 50 kg and is therefore not suitable for being lifted by a single person without risk of injury.

The present invention is derived in part from the realisation that the movement of heated air around or from a damp room should be possible by means of apparatus that is more user friendly than that described in the '960 patent.

SUMMARY OF THE INVENTION

According to a first aspect of the invention there is provided a hand-portable drying apparatus for use in a damp or waterlogged room, the apparatus including a housing having a carrying handle, the housing containing first and second airflow ducts arranged generally parallel to each other and having respective air inlet and air outlet ends, the apparatus further including means to force air through the ducts and to selectively heat it in at least one of the ducts, and valve means within the housing to selectively direct air from the first duct to the second duct whereby, in a first mode, to direct air from within the room received by the second duct back into the room via the first duct or, in a second mode, to expel air from the room via the second duct to outside the room and draw in fresh air from outside the room via the first duct.

With this arrangement, the essentially parallel configuration of the first and second ducts allows for the housing to be of size and shape similar to a suitcase therefore being easily portable. Where multiple such apparatus are to be transported, stored or even used together, each housing may include projections and recesses by which they may be stacked together.

Conveniently, the valve means is a single butterfly valve acting between the walls of the first and second ducts by which, when opened, air entering each duct is free to exit unimpeded through the same duct but, when closed, air entering the second duct is instead redirected to the first duct for recirculation into the room.

Alternatively, the valve means may comprise other types of valve means such as a pair of flap valves, one for each duct which, when closed, together act to circulate air initially drawn in from the room by the first duct to the second duct and expel it back into the room, and when open act to allow the free flow of air through the ducts in opposite directions, allowing fresh air into the room via the first duct and previously recirculated air to be expelled via the second duct.

The housing is conveniently in the form of a suitcase, being of moulded plastics and having a carrying handle, the housing having first and second air flow ducts which each include an electrically driven fan, downstream of at least one of which is an electrically operable heater whereby to selectively introduce heated air into the room being dried, the ducts being pneumatically separated by the valve means, the valve means being operable when closed to redirect air received by the second duct to the first duct and back into the room.

Where the valve means is a single butterfly valve acting between the first and second ducts, each such duct may conveniently be curved towards the other in that region so that when the butterfly valve is closed air entering the second duct is smoothly redirected to the first duct in the opposite direction, for recirculation into the room. To compensate for any restriction to the air flow caused by the curvature of the ducts when the butterfly valve is open, the height of the ducts in this region is preferably raised relative to the height of the ducts elsewhere.

Where the valve means comprises a pair of flap valves, one for each duct, they may conveniently be arranged such that, when closed to prevent ingress or egress of air to ambient, they define a substantially "V" shaped configuration whereby to redirect air moving through the second duct in one direction to the first duct in the other direction and back into the room. The aerodynamic efficiency when the valve is closed may be improved by at least one of the flap valves being curved and being receivable when not in use within a correspondingly shaped recess in the housing.

The present invention in a second aspect is derived from the further realisation that the method described in the '960 patent can be improved in circumstances where it is difficult or impossible to achieve a required temperature of the air within a room being dried due to e.g. the availability only of a low level of electrical power, such as domestic electrical power, or due to the large size of the room being dried.

According to the second aspect of the invention there is provided apparatus for drying a room comprising first and second airflow ducts within a housing, the ducts being switchable by valve means for, in a first mode, closing the valve means to thereafter recirculate air within the room until a given level of humidity has been reached or a given time period has elapsed, and, in a second mode, introducing fresh air from without the room being dried and exhausting air from within the room via first and second fan means, and electric heater means downstream of the first fan means for selectively heating the air in the room, the apparatus further including means to adjust the speed of the first and/or second fan means to control thermal losses from the room.

In a third aspect of the invention, which is applicable to any type of domestically powered room drying apparatus, there is provided a method of drying a room including the steps of providing heater means and first and second airflow ducting and associated first and second airflow fan means, and in a first mode, selectively recirculating heated air within the room while substantially preventing ingress or egress of air into or from the room, and in a second mode for selectively introducing fresh air from without the room being dried and exhausting heated air from within the room being dried, sensing the temperature and/or relative humidity within the room, and adjusting the airflow of the first and/or second fan means in response to an indication that a required parameter has not been reached or has been exceeded when the apparatus is operating in the first mode.

In a further refinement to the invention, the apparatus and method may include valve means which prevents ambient air from entering the room via the apparatus when the exhaust fan is operating so that a negative pressure occurs in the room when the apparatus is operating in this mode. This is particularly useful when measurement of the relative humidity of the air within the room indicates that it is no longer saturated, the negative pressure thereby encouraging the construction materials within the room to give up their water content by increased evaporation. By way of example, the negative pressure valve means may be incorporated within the apparatus or may be provided separately where, in each case, the valve means is only operated to provide negative pressure in the room towards the end of each air recirculation cycle when the relative humidity remains substantially constant or when, after a succession of drying cycles, the relative humidity of air within the room is remaining substantially constant, indicating that the air is in an unsaturated state but that some or all of the room construction materials are still wet or damp.

BRIEF DESCRIPTION OF THE DRAWINGS

The invention will now be described, by way of example only, with reference to the accompanying drawings in which:

FIG. 8 is a schematic plan view of drying apparatus installed within a room and operating in a second mode.

DETAILED DESCRIPTION OF THE DRAWINGS

Figure 1:
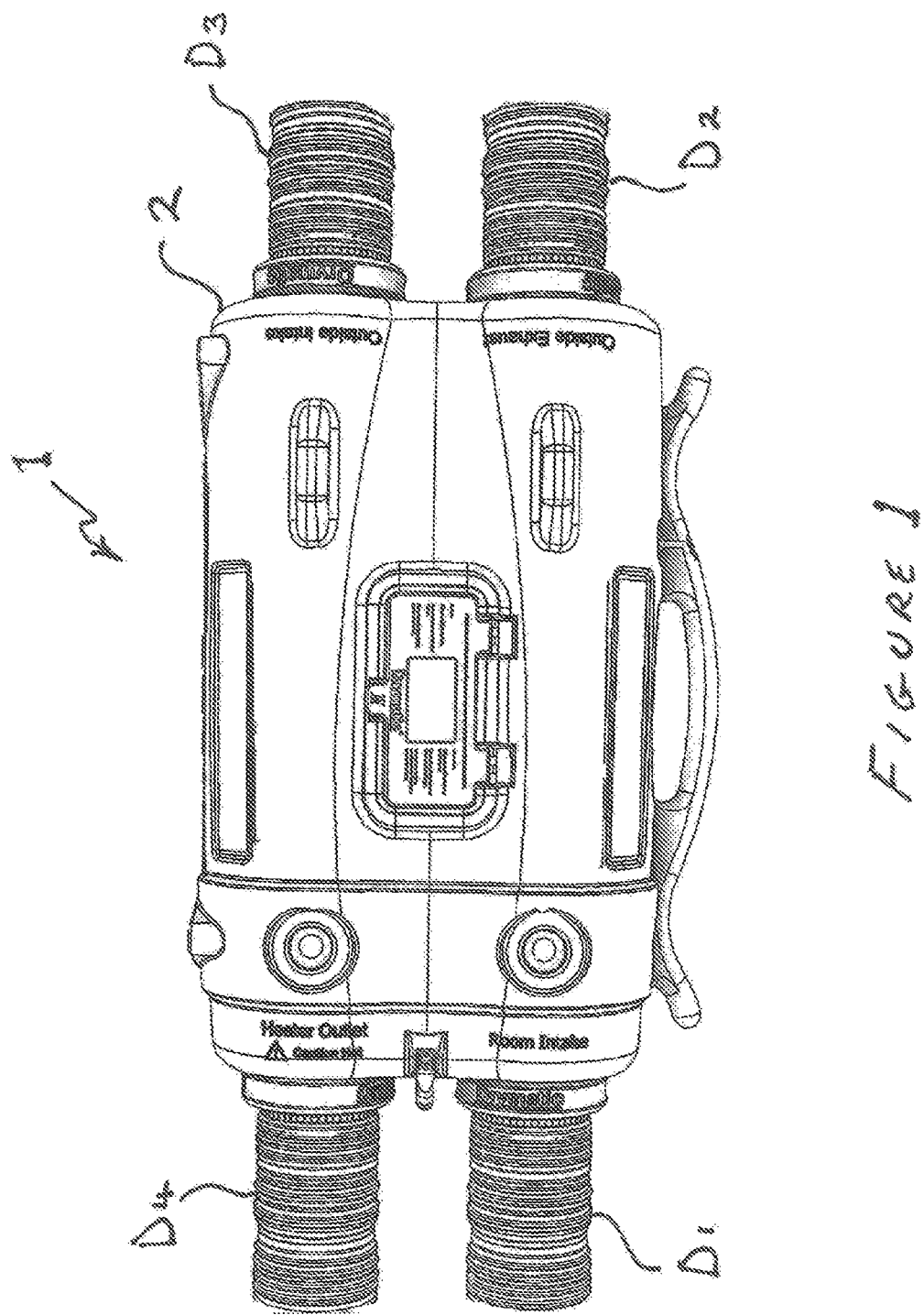
FIG. 1 shows a top view of a hand portable drying apparatus (1) comprising a plastics housing (2) connected at each end to flexible ducts D1, D2, D3 & D4, only part of which are shown.

FIG. 1 shows a top plan view of drying apparatus (1) according to the invention comprising a lightweight plastics housing (2) from each end of which extend flexible ducts D1, D2, D3 & D4, in each case only part of which is shown. Duct D1 is used to introduce air from outside the room being dried, the room itself being pneumatically sealed to avoid accidental ingress or egress of air into or from the room. Duct D2 is used to direct air that has passed through the housing (2) into the room being dried or particular parts of the room being dried. Duct D3 reintroduces air from within the room into the housing (2) and duct D4 exhausts air from the room when required.

Figure 2:
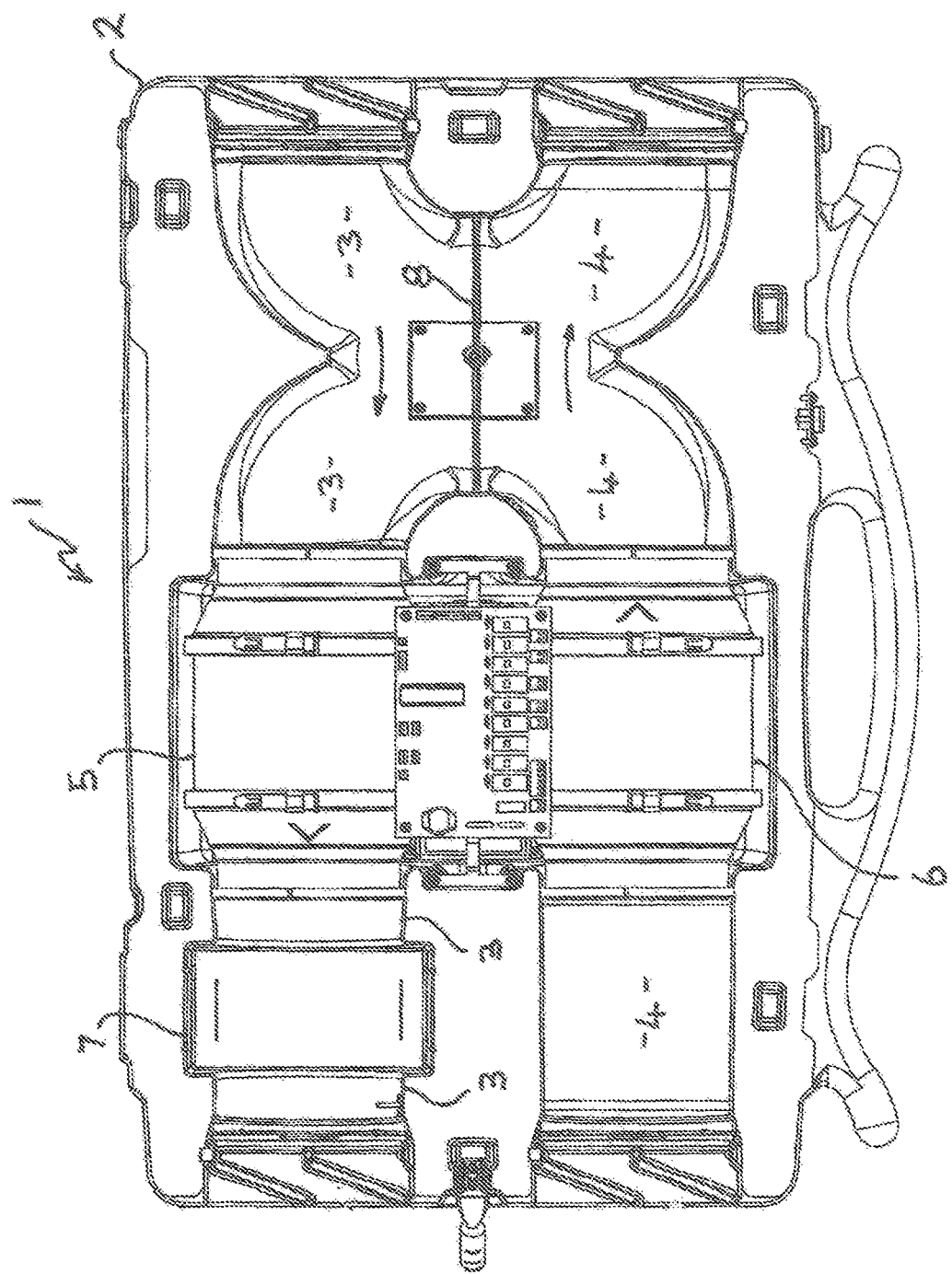
FIG. 2 is an exposed plan view of a first embodiment of the invention in ambient air inlet and exhaust mode.
Figure 3:
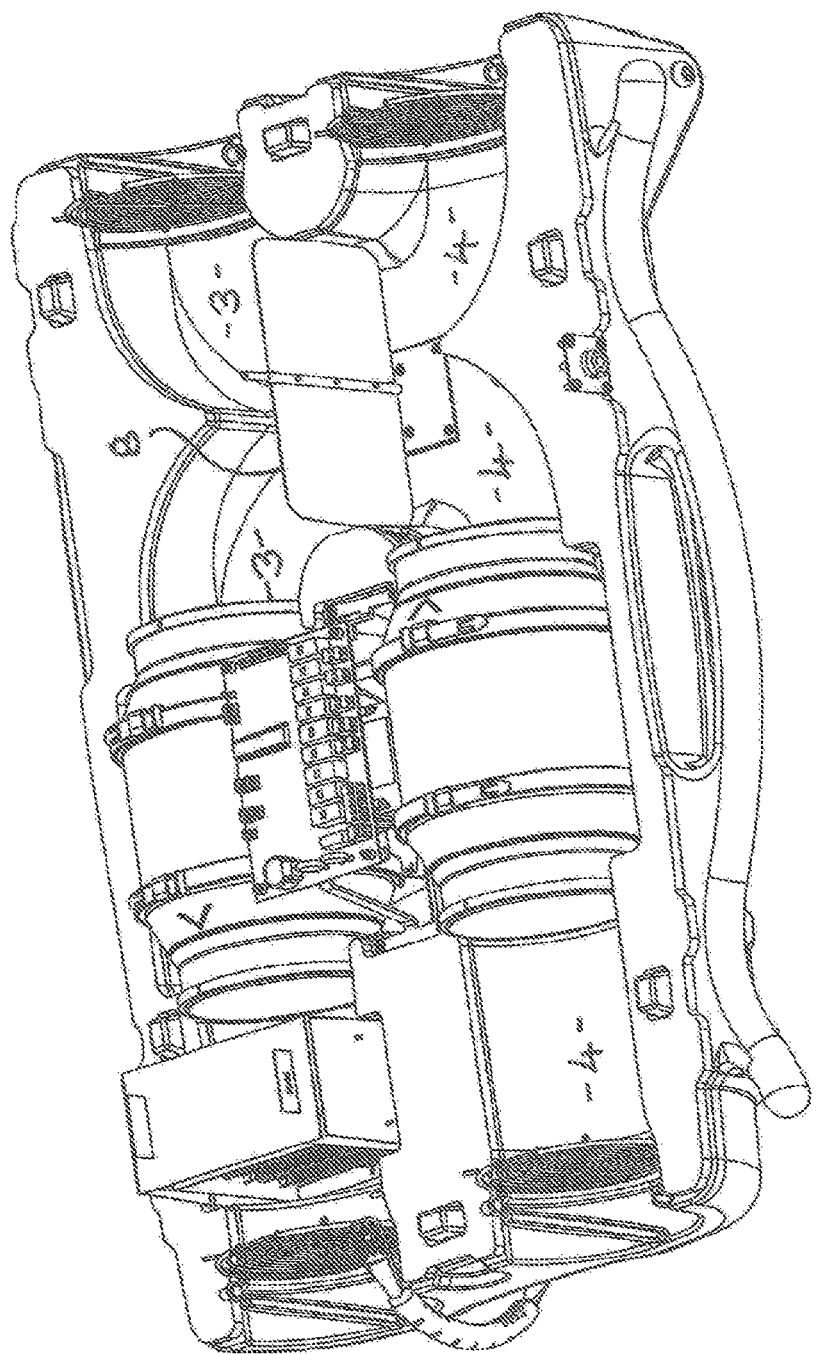
FIG. 3 is a perspective view of FIG. 2

FIG. 2 shows an exposed view of the housing 2 which has a first duct (3) and a second duct (4), each connectable to the flexible ducting of FIG. 1 by which to exchange air from within a sealed room to without the room, such as to ambient air. This is achieved by means of an air inlet fan (5) and an air exhaust fan (6). Downstream of the inlet fan (5) is a heater (7) for selectively heating, as required, air being drawn into the room.

A butterfly valve (8) pneumatically divides the first and second ducts (3, 4) and in the open position shown allows generally unimpeded flow of air coming into the first duct (3), entering the room being dried, and exiting from the second duct (4).

Figure 4:
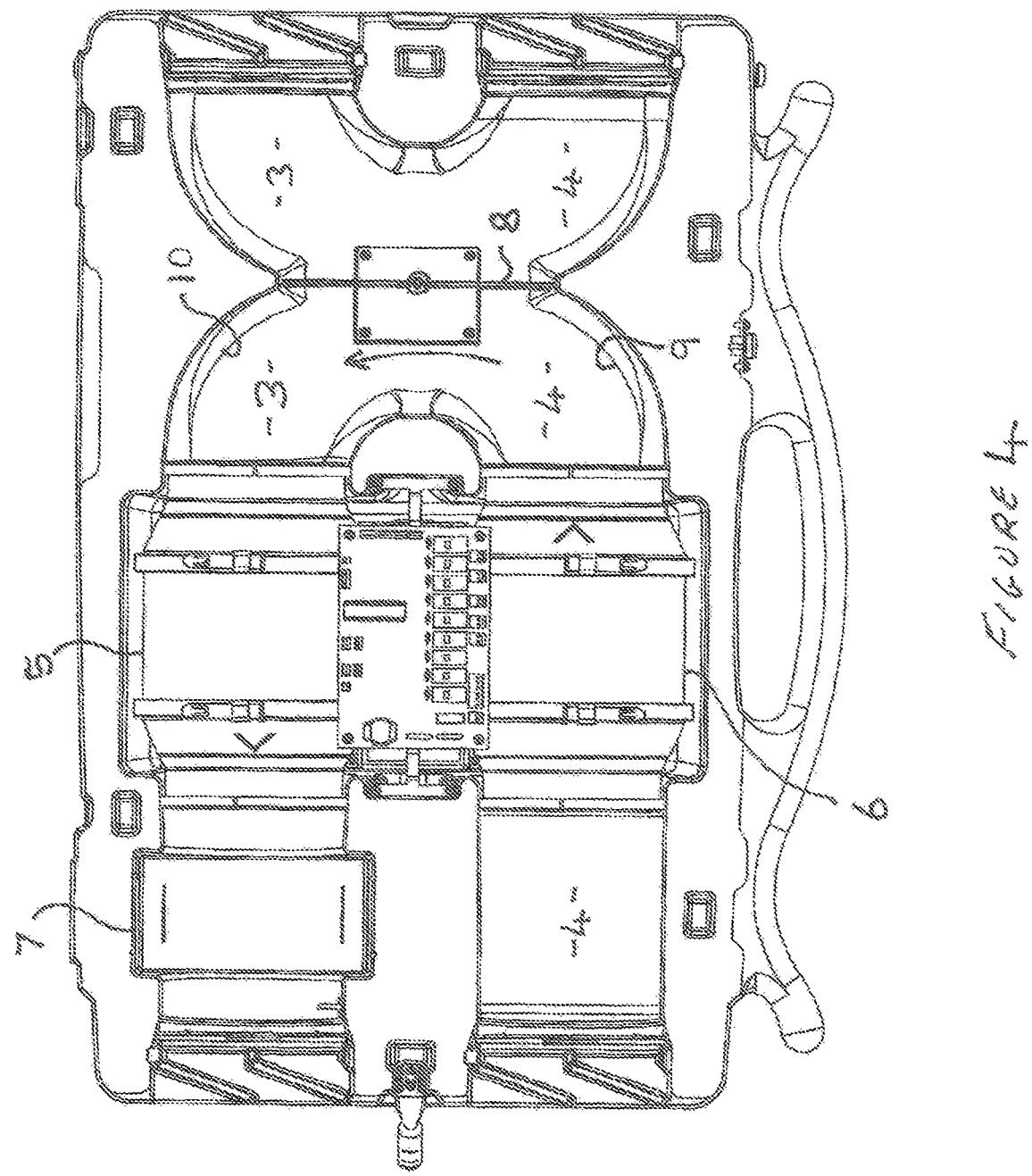
FIG. 4 is an exposed plan of the embodiment of FIG. 2 in air recirculation mode.
Figure 5:
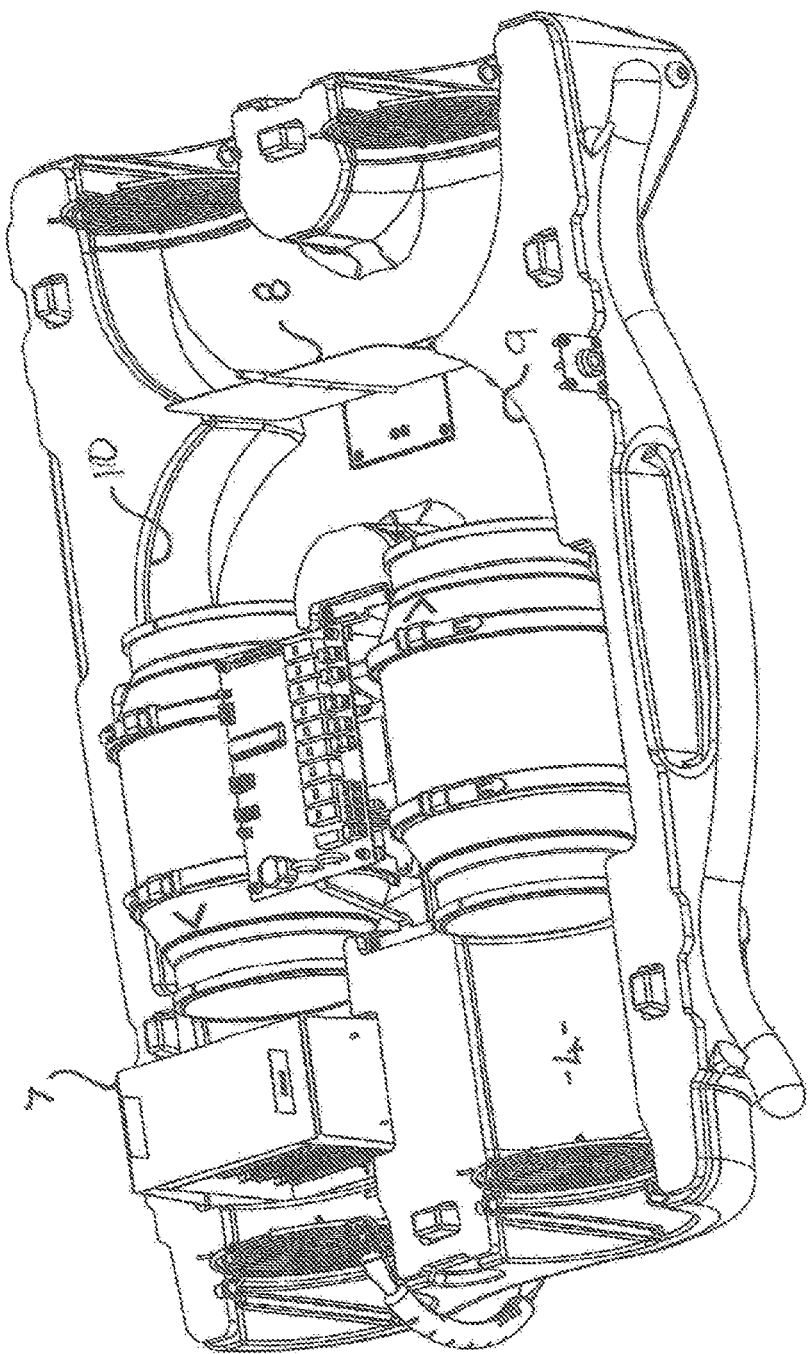
FIG. 5 is a perspective view of FIG. 4.

FIGS. 4 & 5 show an arrangement in which the butterfly valve (8) has been closed such that air entering the second duct (4) from within the room being dried is thereafter redirected by curved surfaces (9,10) from the second duct (4) to that part of the first duct (3) immediately upstream of the fan (5), whereafter it may be selectively heated or re-heated as required until humidity within the room has reached a required parameter or a given time period has elapsed, whereafter the butterfly valve (8) returns to the condition shown in FIG. 2 for the purposes of exhausting the air from within the room and introducing fresh air from without the room. In order to compensate for the more restricted air flow caused by the curved surfaces (9, 10) the height of the ducts (3, 4) is raised in this region.

Figure 6:
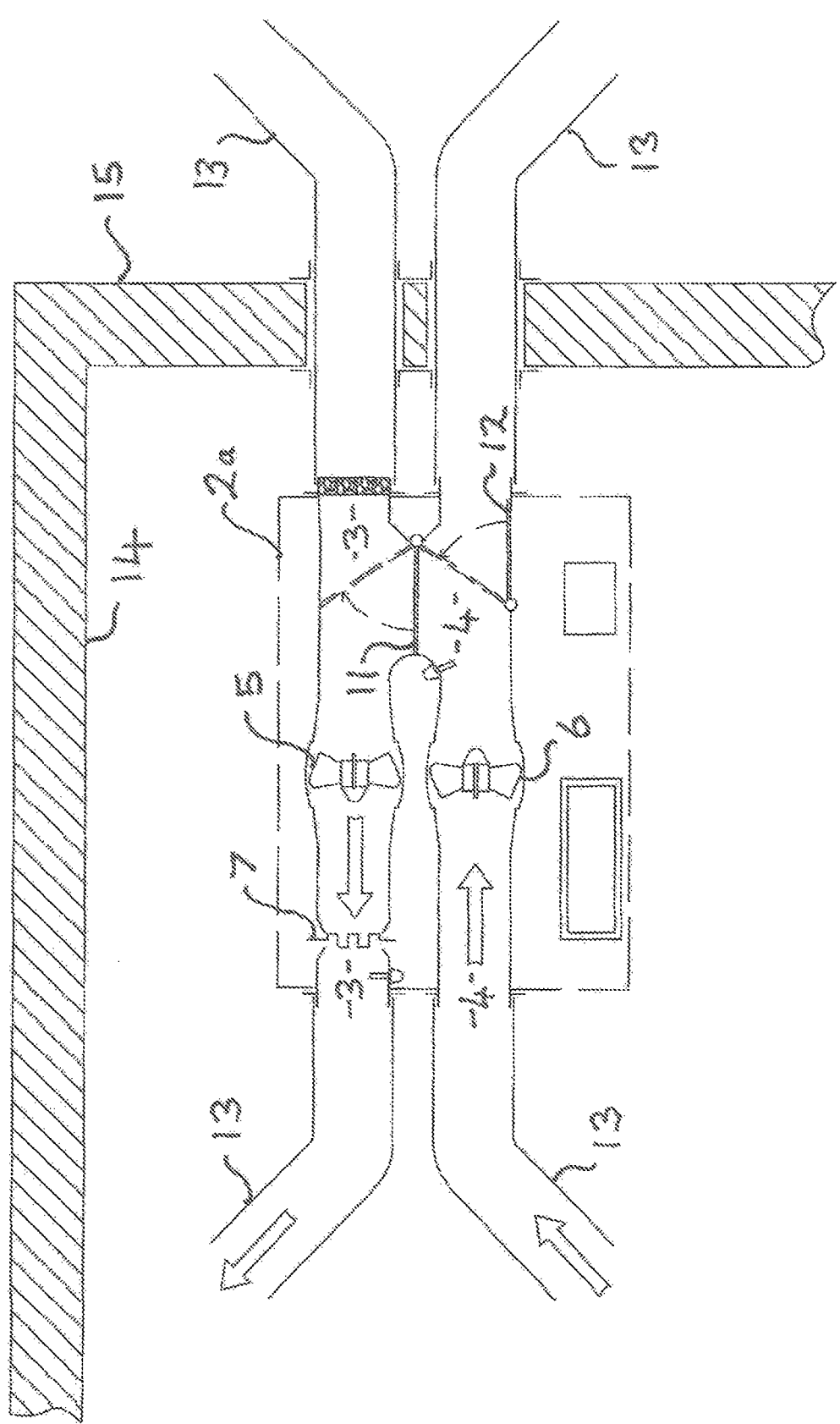
FIG. 6 is a schematic view of a second embodiment of the invention in which a pair of flap valves are used to control air recirculation and air exhaust from the room being dried.

In the alternative embodiment shown in FIG. 6 the housing (2a) is shown connected to flexible ducting (13) by which air can be moved between a room being dried (14) and the outside of the room (15). The valve means within the housing (2a) to selectively direct air from the first duct (3) to the second duct (4) comprises in this case a pair of pivotable flaps (11,12) connected together for synchronous movement by a parallelogram linkage (not shown) which, when moved to the positions shown in broken lines, co-operate to form a generally "V" shaped baffle by which to redirect air entering the second duct (4) to the first duct (3) immediately downstream of the fan (6) and upstream of the fan (5). Hence, when the flaps (11,12) are in the open position shown they allow unimpeded flow of ambient air into the first duct (3) and out of the second duct (4) to ambient but, when closed, they prevent air that has entered the second duct (4) from leaving the room but instead redirect it to the first duct (3) immediately upstream of the fan (7), thereby recirculating the air within the room (14) until a required level of humidity has been reached or a given time period has elapsed.

Each of the embodiments shown in FIGS. 1 to 5 and FIG. 6 are very compact as opposed to the apparatus shown in FIGS. 4 to 7 of the '960 patent and are easily hand-portable. This is particularly convenient for using such apparatus in confined spaces, or where there is only one operator for the apparatus, given that there are often statutory limits to the weight which can be safely lifted by individual employees. The simplicity of the design also lends itself to being manufactured by plastics moulding techniques such as rotary moulding, although it will be understood that other lightweight materials may be used instead, including aluminium. In either case the luggage-style of the housing is convenient for both storage and transport, particularly if the housing includes projections and recesses whereby it may be stored into or onto corresponding projections and recesses which temporarily secure it in place, such as into or onto a cradle for transport or stacked onto another such drying apparatus.

Figure 7:
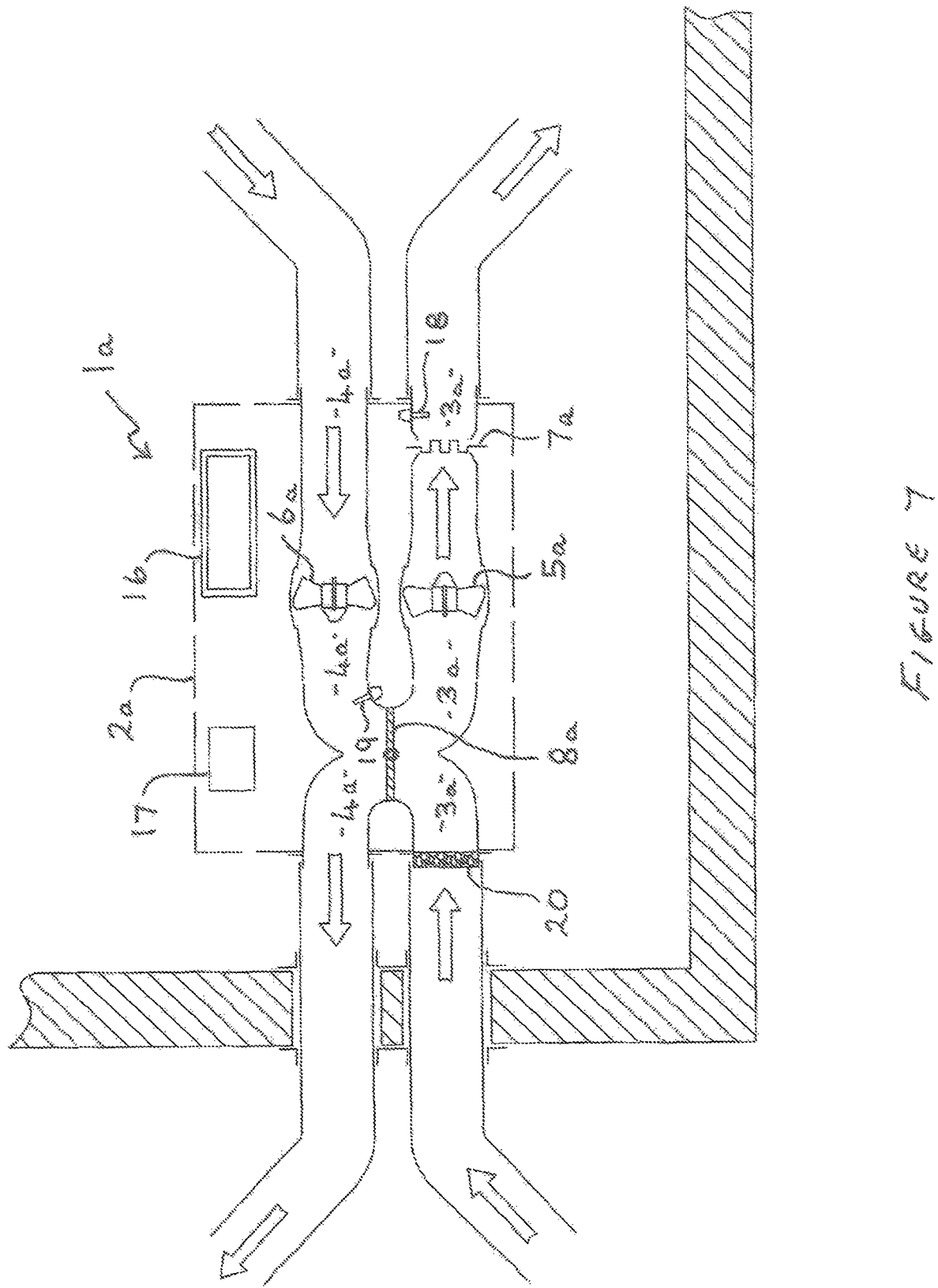
FIG. 7 is a schematic plan view of drying apparatus installed within a room and operating in a first mode.

Turning now to FIG. 7, drying apparatus shown generally at (1a) comprises a housing (2a) a visible display (16) in the form of a touch screen liquid crystal display, and an electronic control unit (ECU) (17) within the housing (2a).

Extending through the housing (2a) are first and second ducts (3a, 4a) separated by a butterfly valve (8a) which, when in its open position shown means that outside air can be drawn into the first duct (3a) via a first fan (5a) and expelled from the second duct (4a) via a second fan (6a). Downstream of the first fan (5a) is a mains-powered electric heater (7a) and further downstream is a thermostat (18) for controlling power supply to heater (7a) on command from the ECU (17) via the touch screen display (16).

Downstream of the second fan (6a) is a temperature and humidity sensor (19) connected to the ECU (17).

Upstream of the first fan (5a) is a coarse filter (20) for preventing or inhibiting the ingress of contaminants such as leaves etc into the housing (2a).

In operation in this first mode, air from within the room is constantly exhausted from it via the duct (4a) and is constantly replenished from air outside of the room via duct (3a). In contrast and as shown in FIG. 8, in this second mode the butterfly valve (8a) has been rotated by 90° to close off one end of the ducts (3a, 4a). Instead, and as shown arrowed, air entering the duct (4a) through the second fan (6a) is diverted in this mode to flow into the duct (3a) and through the first fan (5a), to be thereafter expelled back into the room and recirculated. This recirculation allows air within the room to become saturated by a chosen parameter which, when reached, triggers the apparatus to switch to the exhaust mode shown in FIG. 6 in which the butterfly valve again separates the first and second ducts (3a, 4a) to allow for the saturated air to be exhausted via the second duct (4a) and for fresh air to be introduced via the first duct (3a).

As will be apparent, the majority of flooded rooms occur in premises where only domestic mains electricity is available, with consequent power limited to approximately 13 Amps if the supply voltage is 240 Volts. This can be problematic in cold conditions or where the room being dried is large because it limits the maximum temperature attainable within the room which, in turn, limits the rate of evaporation from saturated surfaces when air is being recirculated within the room.

Accordingly, a further aspect of the invention which is not limited to the use of hand-portable drying apparatus but includes mains operated drying apparatus of the type described in the '960 patent, in which the flow of air through or over the heater means is controlled, such as by varying the speed of the or each fan to suit the particular room being dried. Thus, reducing the speed of the or each fan not only reduces noise within the room and noise pollution in adjacent rooms, but it also has the effect of reducing thermal loss from the room when operating in the mode of introducing fresh air from without the room being dried and exhausting air from within the room via the fan means. This effectively compensates for other thermal losses from the room, such as may be due to inadequate pneumatic sealing of the room or due to the properties of materials within the room, such as water-impermeable stone acting to conduct heat from the room without it heating the air, and damp mortar or plaster. Although reducing the thermal loss in this way can be effective as compared to a situation whereby these other thermal losses are preventing successful completion of the drying process it will, of course, be apparent that the process itself is necessarily extended over-time.

In a further refinement to the invention, the apparatus and method may include negative pressure valve means which prevents ambient air from entering the room via the apparatus when the exhaust fan is operating so that a negative pressure occurs in the room when the apparatus is operating in this mode. This is particularly useful when measurement of the relative humidity of the air within the room indicates that it is no longer saturated, the negative pressure thereby encouraging the construction materials from which the room is made to give up their water content by increased evaporation. By way of example, the negative pressure valve means may be incorporated within the apparatus or may be provided separately. In each case, the valve means is only operated to provide negative pressure in the room towards the end of each air recirculation cycle when the relative humidity remains substantially constant or when, after a succession of drying cycles, the relative humidity of air within the room is remaining substantially constant, indicating that the air is in an unsaturated state but that some or all of the construction materials are still wet or damp.

LIST OF REFERENCE NUMERALS 1, 1a hand portable drying apparatus
2, 2a housing
D1-D4 flexible ducts
3, 3a first duct
4, 4a second duct
5, 5a air inlet or first fan
6, 6a air exhaust or second fan
7, 7a heater
8, 8a butterfly valve
9, 10 curved surface
11, 12 pivotable flap
13 flexible ducting
14 room being dried
15 outside of the room
16 display
17 ECU
18 thermostat
19 sensor
20 filter

The invention claimed is:

1. A hand-portable room drying apparatus for use in a sealed damp or waterlogged room containing air, the apparatus comprising:
   a housing in the form of a suitcase having a carrying handle, the housing including:
      a first inlet adapted to receive air in the housing from outside the room;
      a first outlet adapted to deliver air from the housing into the room;
      a second inlet adapted to receive air in the housing from inside the room;
      a second outlet adapted to expel air from the housing to outside the room;
      a first fan;
      a second fan;
      a heater;
      a system of connectable air flow ducts within the housing connecting the first inlet, the first outlet, the second inlet, and the second outlet, the system of connectable air flow ducts including a first duct and a second duct; and
      a valve within the system of air flow ducts operable between a first position and a second position, wherein in the first position, the system of connectable air flow ducts defines a first set of air flow paths, and in the second position, the system of connectable air flow ducts defines a second air flow path different from the first set of air flow paths;
   wherein the first set of air flow paths is adapted to simultaneously transport air both:

along a fresh air path through at least a part of the first duct, consecutively from the first inlet, through the first fan, along the valve, through the heater, and out the first outlet; and along an exhaust path through at least a part of the second duct, consecutively from the second inlet, through the second fan, along the valve, and out the second outlet; and wherein the second air flow path is adapted to transport air through at least a part of both the first duct and the second duct, consecutively from the second inlet, through the second fan, along the valve, through the first fan, through the heater, and out the first outlet.

2. The hand-portable room drying apparatus of claim 1, further including ducting external to the housing.

3. The hand-portable room drying apparatus of claim 2, wherein the ducting external to the housing comprises at least one duct connectable to the first inlet and adapted to deliver ambient air to the first inlet.

4. The hand-portable room drying apparatus of claim 2, wherein the ducting external to the housing comprises at least one duct connectable to the second outlet and adapted to deliver air from the second outlet outside the room.

5. The hand-portable drying apparatus according to claim 1, wherein the valve is a single butterfly valve.

6. The hand-portable drying apparatus according to claim 1, wherein the system of connectable air flow ducts includes at least one curved surface along the second air flow path.

7. The hand-portable drying apparatus according to claim 1, wherein the housing is a moulded plastic.

8. A hand-portable room drying apparatus for use in a sealed damp or waterlogged room containing air, said apparatus for use in association with external ducting, the apparatus comprising:

a housing in the form of a suitcase having a carrying handle, the housing including:

a first inlet adapted to receive air in the housing from outside the room via the external ducting;

a first outlet adapted to deliver air from the housing into the room;

a second inlet adapted to receive air in the housing from inside the room;

a second outlet adapted to expel air from the housing to outside the room via the external ducting;

a first fan;

a second fan;

a heater;

a system of connectable air flow ducts within the housing connecting the first inlet, the first outlet, the second inlet, and the second outlet, the system of connectable air flow ducts including a first duct and a second duct; and a valve within the system of air flow ducts operable between a first position and a second position, wherein in the first position, the system of connectable air flow ducts defines a first set of air flow paths, and in the second position, the system of connectable air flow ducts defines a second air flow path different from the first set of air flow paths;

wherein the first set of air flow paths is adapted to simultaneously transport air both:

along a fresh air path through at least a part of the first duct, consecutively from the first inlet, through the first fan, along the valve, through the heater, and out the first outlet; and along an exhaust path through at least a part of the second duct, consecutively from the second inlet, through the second fan, along the valve, and out the second outlet; and wherein the second air flow path is adapted to transport air through at least a part of both the first duct and the second duct, consecutively from the second inlet, through the second fan, along the valve, through the first fan, through the heater, and out the first outlet.

* * * * *